United States Patent [19]

Nelles

[11] 4,190,991
[45] Mar. 4, 1980

[54] EXPANDING FIXTURE AND HAMMERING DEVICE THEREFOR

[76] Inventor: Wilhelm Nelles, Nesenhaus 2, D-4030Ratingen 6, Fed. Rep. of Germany

[21] Appl. No.: 888,521

[22] Filed: Mar. 21, 1978

[30] Foreign Application Priority Data

Mar. 26, 1977 [DE] Fed. Rep. of Germany ....... 2713530

[51] Int. Cl.² .............................................. E04F 11/00
[52] U.S. Cl. .......................................... 52/127; 52/20; 52/184; 52/704; 85/83; 182/90; 403/276
[58] Field of Search ................... 52/704, 127, 184, 20; 182/90; 403/276; 85/83

[56] References Cited

U.S. PATENT DOCUMENTS

| 990,460 | 4/1911 | Skelton | 403/276 X |
|---|---|---|---|
| 3,332,312 | 7/1967 | Bixby | 85/83 |

FOREIGN PATENT DOCUMENTS

| 1110113 | 7/1961 | Fed. Rep. of Germany | 52/704 |
|---|---|---|---|
| 2254550 | 5/1973 | Fed. Rep. of Germany | 182/90 |
| 2326608 | 4/1977 | France | 403/276 |
| 1010809 | 11/1965 | United Kingdom | 52/704 |

*Primary Examiner*—Alfred C. Perham
*Attorney, Agent, or Firm*—J. Harold Nissen

[57] ABSTRACT

An expanding fixture for securing an element to a wall or ceiling by securing the element to a bore in the wall or ceiling. The element includes a hollow end portion and an expanding piece adapted to fit within the hollow end for expansion thereof after insertion into the bore. The expanding piece includes at one end thereof two oppositely extending end sections which do not enter the bore and rest on the surface of the wall or ceiling and at the other end of the expanding piece, there is provided an expansion member to press the walls of the hollow section against the wall of the bore. A hammering device which is adapted to fit over the element away from the portion thereof which enters the bore to press the extension member and hollow section when in the bore together to provide a tight fitting engagement between the wall of the bore and the outer wall of the hollow section.

14 Claims, 13 Drawing Figures

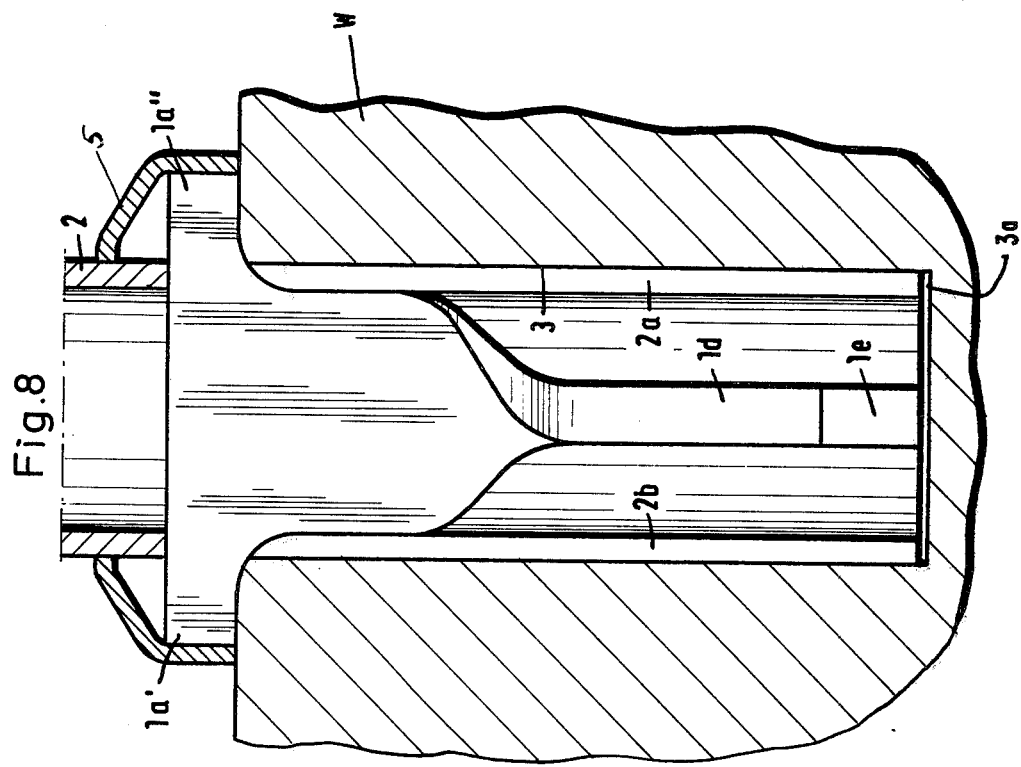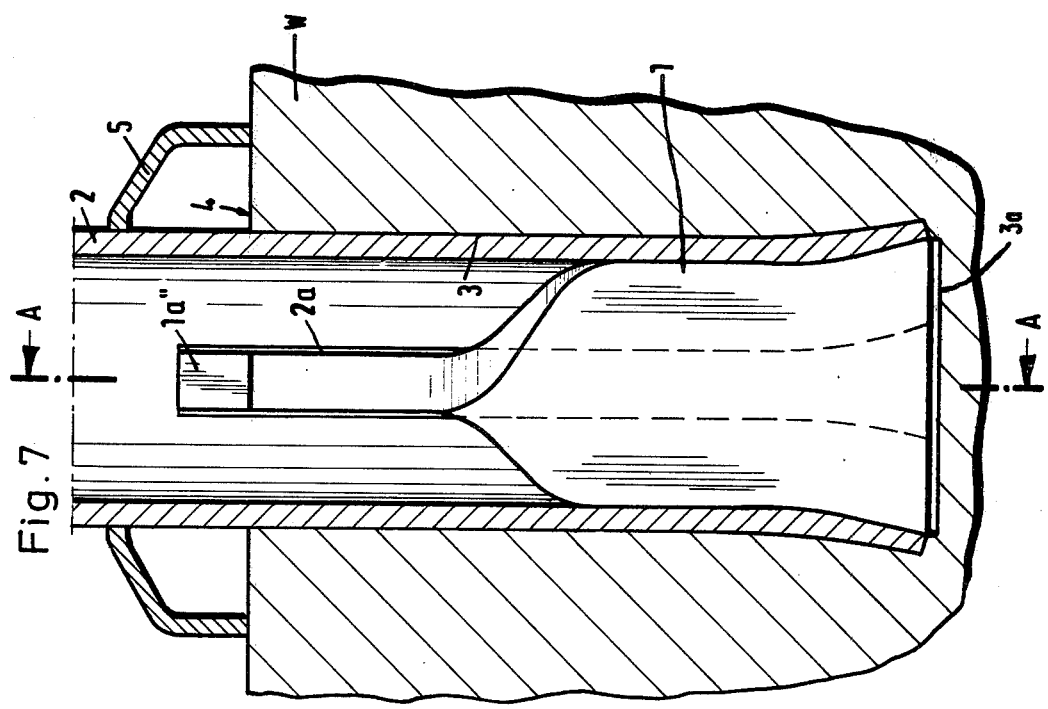

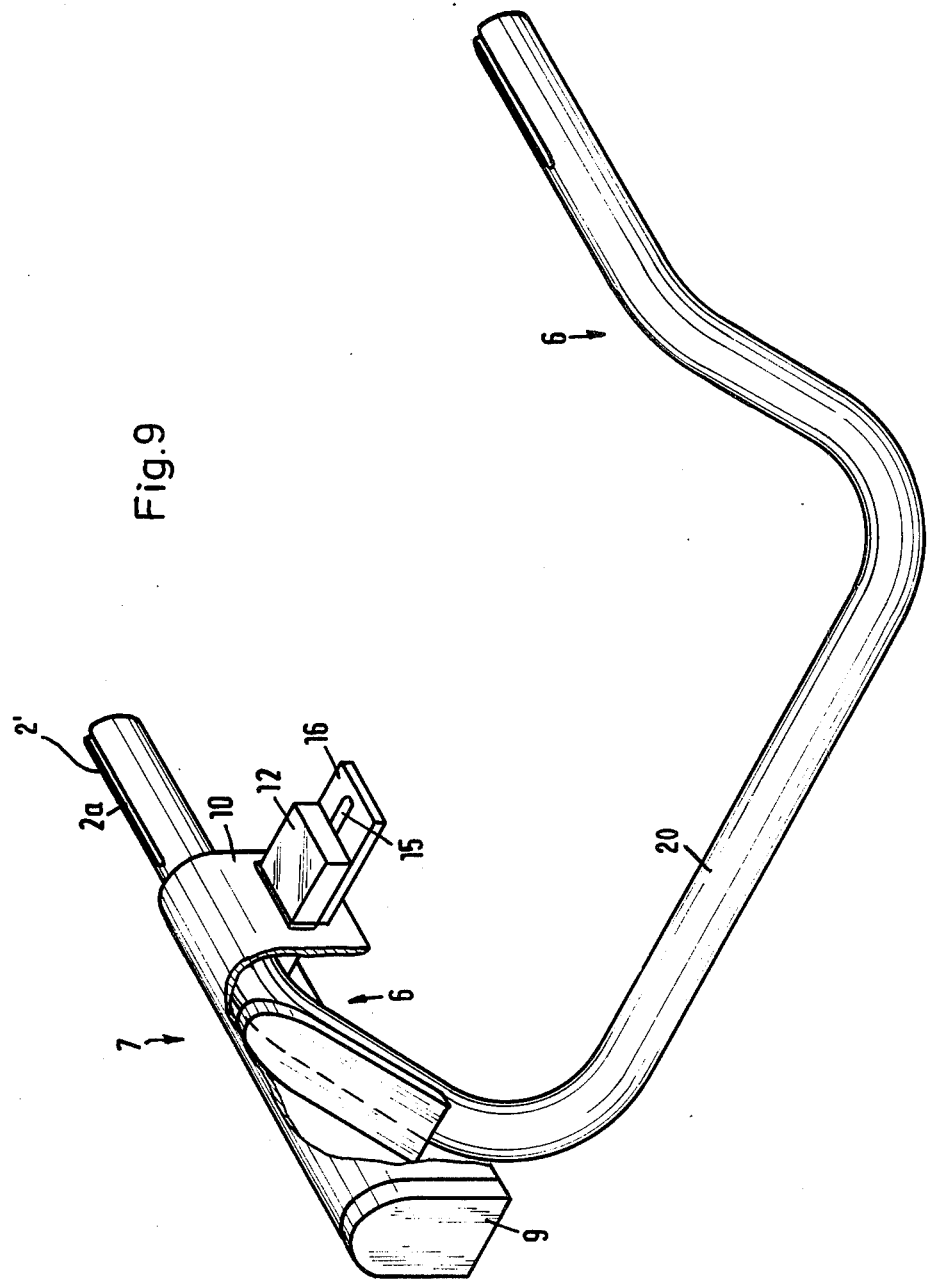

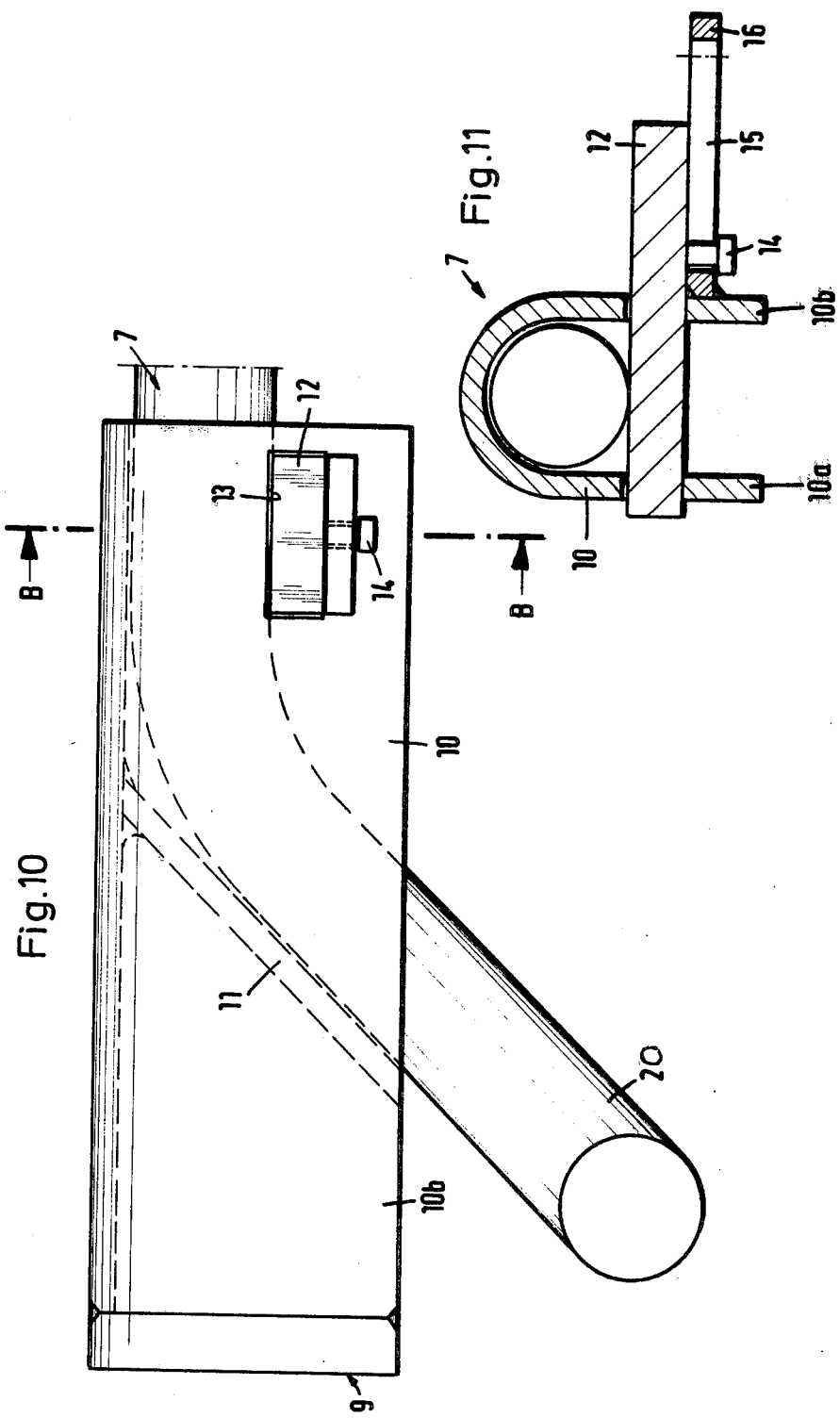

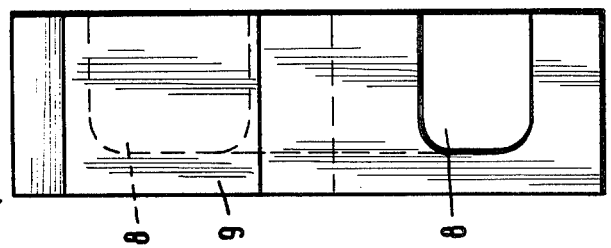
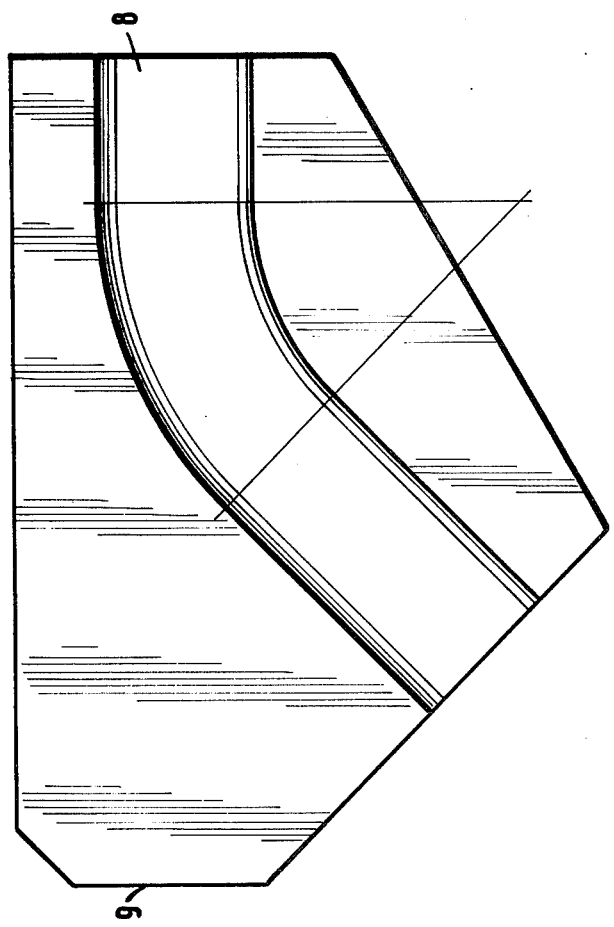

EXPANDING FIXTURE AND HAMMERING DEVICE THEREFOR

BACKGROUND OF THE INVENTION

1. Field of the Invention

This invention relates to an expanding fixture for securing an element to a wall or ceiling by securing the element to a bore in the wall or ceiling.

More specifically the invention is concerned with the use of an expanding fixture to secure the element in a bore. The element includes a socketed part to be driven into the wall ceiling, and is associated with an expanding piece which is composed of flat material which penetrates into the socket piece. The expanding piece is arranged with a tapered section to widen the socket and press the socket against the wall of the bore. The expanding piece also includes a part which projects beyond the socket diameter on a side opposite to the bore base, and this is situated in a longitudinal slot of the socket and is arranged so that it can be supported on the edge of the bore.

2. Description of the Prior Art

One type of such expanding fixture is known from German Pat. No. 2,135,333. This known expanding fixture does not require or use the base of the bore to support the expanding piece, and therefore, the bore may accidentally be made deeper than necessary. The elements which are to be fixed in the wall or ceiling are secured on the expanding piece in this known expanding fixture; the expanding piece has special holding means e.g. an integral hook, for this purpose which projects from the socket eccentrically out of a longitudinal slot thereof. In order to secure a hollow section such as, for example a tube, onto the hook of the expanding piece, a great deal of work is involved; and, after screwing or welding thereon, the hold achieved is not firm enough for high torques to be absorbed. The reason for this is that the end of the expanding piece which is composed of flat material projecting out of the bore can be bent transversely and can mainly be put under tension parallel to the bore axis. As the expanding piece is only supported on the edge of the bore on one side, the expanding piece including the socket can tilt, while the socket is being driven in and therefore be set off-center after the socket has been driven in. This is particularly so when the bore is slightly too large. Furthermore, a bore which is too shallow can lead to a strong jolting of the conical, undulating section of the expanding part so that the socket no longer laterally passes the inner end of the expanding part.

It is known from German Pat. No. 1,110,113 to provide slots at the end of a rod and introduce an expanding piece formed from a cylindrical part into the slots. This expanding piece is supported on the floor of the bore while the rod is being driven in so that a bore hole which has been drilled too deeply does not provide a fixture which is exact in measurement. The production of the aforesaid solid expanding piece is moreover quite costly.

SUMMARY OF THE INVENTION

It is therefore an object of the invention to provide an expanding fixture which includes a hollow section for use in securing the fixture so that the fixture can be secured with a low amount of work and with a high degree of accuracy of measurement, and after the ture is secured, it can be loaded transversely to the b_

According to the invention there is provided an expanding fixture for securing an element in a bore, the element having a socket part which is adapted to be driven into the wall. The expanding fixture includes an expanding piece composed of a flat material which is adapted to be driven into the socket part for penetration thereof. The piece is provided with a tapered section which is arranged to widen the socket due to its tapered section and presses the socket against the wall of the bore. The expanding piece has a projecting part which projects beyond the peripheral extent of the socket as it is longer than the diameter of the socket on the side opposite from the bore base. The last-mentioned part is situated in a longitudinal slot which is provided in the socket and is supported on the edge of the bore. And, the element which is to be secured to the wall or ceiling has a hollow section. The end of the element to be secured forms the socket part, and the part of the expanding piece which projects beyond the peripheral extent of the socket has two opposing ends which project beyond the hollow section at two positions, respectively.

In the socket arrangement according to the invention, the socket can bear considerably greater transverse forces, and is loaded after anchoring in the bore. Moreover, the socket is loaded, and the expanding piece is not loaded. The socket forms a continuation and an extension of the hollow section to be secured so that an additional socket is unnecessary. To secure a hollow section in a wall or on a ceiling, it is sufficient to form two slots in the end of the hollow section and introduce the expanding piece into the socket. The hollow section is then driven into the bore in the wall or ceiling. This work can not only be carried out very quickly, but it also results in a fixture with a high degree of accuracy in measurement, as the expanding piece is prevented from tilting. A bore which is too shallow does not result in the deformation of the expanding piece, and, the base of the bore assumes and provides for the necessary support for the expanding piece in this case.

The expanding piece is flat and narrow and has the form of a tapered section. This embodiment is constructively particularly simple and is easy to produce as it is made from a flat material. The flat and the narrow sides of the tapered section broadens out toward the base of the bore and abuts the inside wall of the hollow section. The narrow sides can therefore be arranged approximately parallel to the longitudinal axis in a section which is situated nearer to the opening of the bore and only broaden out in a section facing the base of the bore. Accordingly, very exact guidance of the expanding piece is achieved and, in addition splaying of the end of the hollow section or end of the socket is achieved in a relatively short end area. This permits high pressures to be applied against the wall of the bore and all the way in deeply on the inside of the wall ceiling.

Preferably, the projecting part is turned round the longitudinal axis by approximately 90° in the manner of a screw in relation to the section which causes the hollow section to expand. This turning in the manner of a screw is a desirable condition in order to produce the expanding piece from a flat material. It is not required that the flat material be considerably deformed in order to achieve a tapered extension of the expanding piece in an angle range which is shifted in relation to the longitudinal slot of the hollow section.

The expanding piece may be produced by a simple punching process if it is T-shaped, so that the part which projects over the diameter or periphery of the hollow section is formed from the cross piece, and the expanding section is formed from the stem of the "T".

Conveniently, the hollow section is provided with two longitudinal slots to accommodate the two opposing ends, respectively. Furthermore, the expanding piece may have a surface abutting the base of the bore on its side facing the end of the bore. When a bore with a precise length is used, an additional hold can be created for the expanding piece. And, for a bore with too short a length, the base of the bore acts as an alternative to the edge of the bore.

Preferably, to exert the expanding pressure, the inside diameter of the hollow section is reduced by projection elements against which the expanding pieces comes into abutting relationship. It is not necessary here for the expanding piece to broaden out, but expansion of the hollow section is achieved in the same way by this narrowing of the inside of the hollow section.

The expanding fixture is particularly advantageous for use with stirrups or steps produced from tubing. When stirrups are used, both tube ends are provided with the longitudinal slots, and each tube end is positioned in its respective bore in the wall.

According to a further aspect of the invention, a hammering device is used to drive in the expanding fixture of the kind referred to into the wall or ceiling. The hammering includes a hollow section having at least one curve or curved portion outside the area of the hollow section which enters the bore. The hammering device can be set on the hollow section in the area of the curved portion. The hammering device has a recess to accommodate the curve or curved portion, and an impact surface is provided which is arranged transversely to the longitudinal axis of the bore at the height of the latter.

The hammering device is simply produced and yet very solid. Preferably, the recess is formed with a "U" shaped profile member having flanges or flange legs. A disc is secured between the flanges and on an incline corresponding to the curve or curved portion, and a carrier bracket is arranged to be slid into aligned corresponding openings provided in each of the flanges. The impact surface is formed on the front side of the "U" shaped profile member opposite to the bore. It is preferable that the carrier bracket has a pin to restrict its sliding movement path. A guidance part is positioned outside the "U" shaped profile member, and the guidance part is provided with a slot to guide the path of movement of the pin.

Other objects, advantages and the nature of the invention will become readily apparent from the detailed descriptions of the preferred embodiments of the invention taken together with the drawings.

BRIEF DESCRIPTION OF THE DRAWINGS

FIG. 7 is a transverse cross-section view of an end portion of the hollow section in its condition when inserted in a bore, and with the expanding piece shown in its expanded condition, the expanding piece is not shown in cross-section but in partial perspective;

FIG. 8 is a section taken along line A—A of FIG. 7, and the expanding piece is not shown in cross-section but in partial perspective;

FIG. 9 is a perspective representation of a tubular hollow section combined with a stirrup (step, tread) forming an extension of the hollow section and with a hammering device operatively associated with the stirrup;

FIG. 10 is a lateral or side view of the hammering device and stirrup forming an extension of the hollow section as shown in FIG. 9;

FIG. 11 is a section taken along line B—B of FIG. 10;

FIG. 12 is a lateral or side view of an alternative embodiment of a hammering device according to the invention; and, FIG. 13 is a front view of the hammering device according to FIG. 12.

DESCRIPTION OF THE PREFERRED EMBODIMENTS

Figure 1:
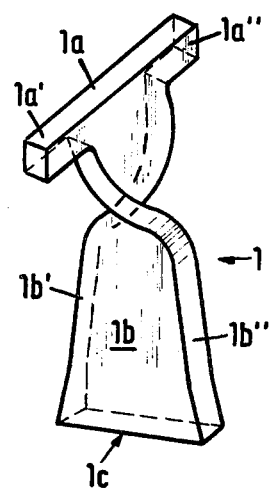
FIG. 1 is a perspective view of an expanding piece for an expanding fixture in accordance with the invention.
Figure 2:
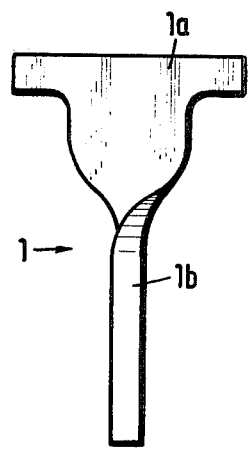
FIG. 2 is a lateral view of the expanding piece.
Figure 3:
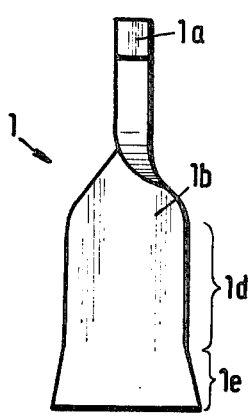
FIG. 3 is another lateral view of the expanding piece viewed from a direction displaced by 90° from the view of FIG. 2.
Figure 4:
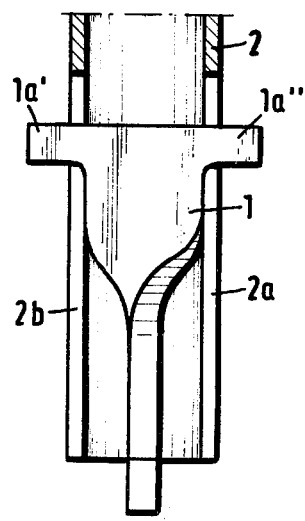
FIG. 4 is a cross-sectional view taken through an end portion of a tubular hollow section with the expanding piece inserted into the hollow section, but shown in its unclamped condition.
Figure 5:
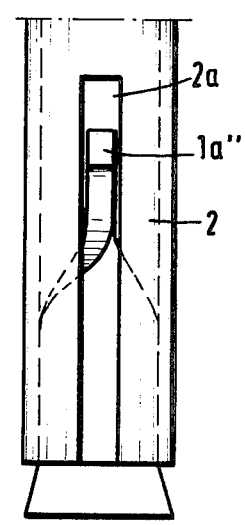
FIG. 5 is a lateral view of FIG. 4 and displaced by 90° therefrom.
Figure 6:
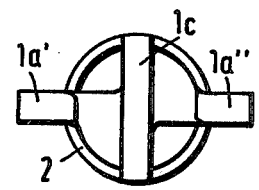
FIG. 6 is a top view of the hollow section and expanding piece in place therein as shown in FIGS. 4 and 5.

Referring now more particularly to FIGS. 1-8 of the drawings which illustrates one embodiment of an expanding fixture according to the invention for securing an element to a bore 3 in a wall W, the expanding fixture includes a socket-part comprising a tube or tubular portion 2, and an expanding piece 1 which cooperates with the tube 2 of the socket to be held thereto.

Tube 2 has an outer circumference or diameter to fit within the bore 3. The bore 3 is a blind bore which is in a wall or a ceiling. Tube 2 is provided with diametrically opposed longitudinal slots 2a, 2b. These slots start from one end of tube 2 and extend in a longitudinal direction parallel to the longitudinal axis of the tube 2, but end short of the other end of the tube 2 so that the slots 2a, 2b open towards the end of tube 2 initially inserted into bore 3.

Expanding piece 1 includes a T-shaped member having an upper cross piece 1a and a stem or section 1b. Cross piece 1a and section 1b are axially aligned along a longitudinal axis, but cross piece 1a is rotated so that its wide face is at a 90° angle to the side face of section 1b. The lateral extent of cross piece 1a is greater than the lateral extent of section 1b. Cross-piece 1a includes two opposite ears or oppositely disposed end sections 1a' and 1a" which are adapted to fit within slots 2a and 2b and project beyond the peripheral portion of the socket. The longitudinal extent of expanding piece 1 is greater than the longitudinal extent of tube 2. Stem 1b includes a first section 1d and a second section or expansion member 1e. The second section 1e has a width along its wide face greater than the width of first section 1d along its wide face and has a width greater than the inner diameter of tube 2. The first section 1d has a width along its wide face less than the width of the second section 1e and substantially equal to the inner diameter of tube 2. The expanding piece 1 can be slid into the tube from the other tube end away from bore 3. The expanding piece is composed, as shown in FIGS. 1 to 8, of a T-shaped piece of sufficiently strong sheet metal which is punched from flat material. The upper cross piece of the "T" is arranged at right angles to the stem of the "T" and forms a part 1a. The strength of end sections 1a' and 1a" corresponds to that of the piece of sheet metal and the width of the end sections corresponds to the width of the longitudinal slots 2a, 2b and which project a long way beyond section 1b, so that they project beyond the outer wall of the tube when the expanding piece 1 has been inserted into the tube 2 and comes into abutment with the front surfaces of the bore and thus lies on the outer surface of the wall or ceiling.

The stem or section 1b of the expanding piece 1 can be a twisted body, the cross-section of which is adjusted so that it can be accommodated within the internal cross-section of the hollow section of the tube 2. Therefore, the section 1b can be tapered or formed in the shape of a truncated cone with a tube with circular cross-section and pyramidal, or section 1b can have the shape of a truncated pryamid with a rectangular tube or two trapezoidally-shaped sections. An expanding piece accommodating a great number of different cross-sections results if its section 1b is provided with two opposing narrow sides 1b', 1b" which abut the inside wall of the tube 2; the two opposing narrow sides 1b', 1b", each include a first section 1d and second section 1e angulated to each other such the the opposing narrow side portions of section 1e extend further from the longitudinal axis of piece 1 than the side portions of 1d. Section 1d of these narrow sides are laid towards part 1a and are parallel to the longitudinal axis of the expanding piece as well as that of the tube. Section 1e is connected with and borders on section 1e and diverges as it extends toward the end of the tube. The width of section 1b includes the area of section 1d and corresponds in diameter approximately to the inside diameter of the tube and includes the section 1e which broadens out towards the tube end so that the section 1e projects from the tube end when the tube is in a non-expanded condition. The sides 1b', 1b" of expanding piece 1 come into abutment inwardly in an area of the tube 2 where the longitudinal slots 2a, 2b do not extend, the section 1b between section 1d and part 1a is rotated or turned 90° around its longitudinal axis in the manner of a screw in relation to part 1a. In its expanded and clamping condition, the section 1e presses linearly on both of its sides against the inside wall of the tube 2 and thereby produces a very high pressure. While it has not been shown in the drawings, friction between the tube and the bore wall can be increased by the use of graduations, cross ribs, longitudinal ribs or bosses which can be arranged on the outer longitudinal ribs or bosses which can be arranged on the outer periphery of the tube 2, at least in the area of second section 1e.

The front side of upper cross piece 1a of the expanding piece 1 projects out of the tube and is arranged at right angles to the longitudinal axis of the tube and forms an abutting surface 1c which abuts the base of the bore 3a if the bore 3 has not been drilled too deeply into the wall or ceiling W. With a bore depth which has been exactly calculated, therefore, the expanding piece 1 is pressed by inserting the abutting surface 1c formed on the base of second section 1e of section 1b into the inside of the tube. When the bore is too deep, and there is room below tube 2 at the base 3a of bore 3, upper cross piece 1a is abutted against the front surface 4. A covering ring 5, which is pushed onto the tube, is provided (see FIGS. 7 and 8) to cover the sections 1a', 1a", of part 1a which lie outside the bore 3. FIG. 9 illustrates an example of a stirrup, step or tread which can be connected with a wall surface and includes an expanding fixture construction of the type illustrated in FIGS. 1 to 8, the stirrup includes a bent tubular member 20 having at each end a tube portion 2' similar to tube of FIGS. 1-8. Tubular portion 2' is provided with longitudinal slots 2a in the same manner as tube 2. While the stirrup 20 is intended to be secured to a vertical wall it can also be secured to a ceiling and be used as a hanger.

Bent tubular member 20 includes a straight portion and two arms each connecting a respective one of the tube portions 2' to the straight portion. Each of the arms includes a curved portion 6. A hammering device 7 in order to force tube portions 2' into the bore in the ceiling or wall is provided in the area of the curved portion 6 and secured to tubular member 20.

Hammering device 7 includes a U-shaped profile member 10 having legs 10a and 10b. The U-shaped profile member 10 surrounds the tubular member 20 in the area of the curved portion 6, so that the longitudinal axis of the U-shaped profile member lies parallel to the section of tube portion 2' of the tubular member 20 which is slid into the bore, so that this section of the tubular member abuts inwardly on the U-shaped profile member. Hammering device 7 includes a disc 11 welded on an incline onto the inside of the U-shaped member 10. Disc 11 abuts a flanged portion formed on the curved portion 6 of tubular member 20 and points away from the bore.

Each of the legs 10a and 10b is provided with a right-angled opening 13 aligned with each other in a direction transverse to the longitudinal axis of tube portion 2'. Right angled openings 13 are positioned proximate to one end of the hammering device 7 and positioned further between tube portion 2' and curved portion 6, in order to receive a carrier bracket 12 which is slidably attached to U-shaped profile 10 at right angles thereto and to the longitudinal axes thereof, so as to secure the hammering device 7 to the stirrup. Carrier bracket 12 includes a guidance part 16 which is welded onto the front surface of U-shaped profile 10. Guidance part 16 is provided with a longitudinal slot 15. The carrier bracket 12 has a pin 14 which is slidably arranged in the longitudinal slot 15. The guidance part 16 is welded onto the flange 10b on the outside thereof so as to be parallel to the carrier bracket 12. An impact surface 9 is welded onto the front surface of the U-shaped profile member 10 at right angles on the side opposite to the bore transversely to the longitudinal axis thereof and at the height thereof. And, a hammer can be used on this impact surface to drive the tube into the bore.

Referring now to FIGS. 12 and 13 which illustrates a modification of the hammering device shown in FIGS. 9 to 11, and illustrates a hammering device 7' composed of a solid disc-shaped piece of metal. Hammering device 7' includes shaped, or channel-shaped recess 8 arranged on the wide side thereof. The shape of recess 8 corresponds to and conforms to the curved portion 6 in the tubular member 20 so that this hammering device is set on the tube or on the stirrup from the side and not from above. Also this hammering device 7' has an impact surface 9 on the side opposite to the bore which surface 9 is arranged at right angles to the longitudinal axis of the bore.

While there has been shown what is considered to be the preferred embodiments of the invention, it will be obvious that many changes and modifications may be made therein without departing from the scope of the invention.

I claim:

1. An expanding fixture for securing an element to a wall or a ceiling by securing the element to a bore in the wall or ceiling, comprising:
   a socket adapted to be driven into the bore in the wall, said socket having a longitudinal slot and a hollow section;
   an expanding piece formed of a flat material to penetrate into said hollow section of said socket, said piece including a widening portion at one end and a slot engaging portion at the other end, said widening portion widening said socket and pressing said socket against the wall of the bore, said slot engaging portion including a section which is wider than the diameter of said socket and a part which projects beyond the peripheral portion of said socket on a side thereof opposite to the bore base, said slot engaging portion being supported on the edge of the bore; and
   said element to be secured being coextensive with said said socket and extending from said hollow section.

2. An expanding fixture according to claim 1, wherein said expanding piece has a tapered section and is flat, said tapered section having narrow sides which broaden towards the base of the bore and are arranged to abut the inside wall of the hollow section.

3. An expanding fixture according to claim 2, wherein said narrow sides include a first section in which the sides thereof are approximately parallel to the longitudinal axis and a second section which is situated nearer to the opening of the bore and in which the sides of said second section broaden out in a direction facing the base of the bore.

4. An expanding fixture according to claim 1, where said projecting part is turned round the longitudinal axis by approximately 90° in the manner of a screw, in relation to said widening portion.

5. An expanding fixture according to claim 1, wherein said expanding piece is T-shaped, and said slot engaging portion including part of the stem of the "T" and a cross piece connected to the stem of the "T".

6. An expanding fixture according to claim 1, wherein said slot engaging portion includes two projecting parts, and said hollow section includes two longitudinal slots to accommodate the two opposing ends of said two projecting parts respectively.

7. An expanding fixture according to claim 1, wherein said expanding piece includes a surface abutting the base of the bore on its side facing the end of the bore.

8. An expanding fixture according to claim 1, wherein the inside diameter of said hollow section is reduced by projection elements against which the expanding piece comes into abutting relationship to exert the expanding pressure.

9. An expanding fixture according to claim 1, wherein the element to be secured is a stirrup, said stirrup is formed from a tube and both ends of said tube have longitudinal slots and are positioned in respective bores of a wall.

10. A hammering device for driving in an expanding fixture as claimed in claim 1, including; p1 a hollow section having at least one curved portion outside the bore, said hammering device being set on the hollow section in the area of said curved section,
   said hammering device having a recess to accommodate said curved portion and including an impact surface which is arranged transversely to the longitudinal axis of the bore at the height of the latter.

11. A hammering device according to claim 10, including a U-shaped profile member forming said recess, said U-shaped profile member including flange legs, between said flange legs and a disc is secured on an incline corresponding to said curved portion, said flange legs being provided with aligned openings, and a carrier bracket arranged to be slid into said aligned openings and said impact surface, being formed on the front side of said "U" shaped profile member opposite to the bore.

12. A hammering device according to claim 11, wherein said carrier bracket includes a pin to restrict its sliding movement, and including a guidance part connected to and positioned on the outside of said "U" shaped profile member, said guidance part including a slot in which said pin slides.

13. A hammering device for driving an expanding fixture as claimed in claim 1 into a wall or ceiling, comprising:
   a channel shaped member having an inner surface conforming to the outer surface of said element to be secured, and
   an impact surface on the outside of said channel-shaped member on a side thereof opposite to the bore, said impact surface being at right angles to the longitudinal axis of the bore.

14. An expanding fixture for securing an element to a wall or ceiling by securing the element to a bore in the wall or ceiling, comprising:
   a socket adapted to be driven into the bore of the wall,
   said socket including a tubular portion fitable within the bore and engageable with a wall portion surrounding the bore, said socket part being provided with a pair of longitudinal slots extending axially thereof from an end thereof adjacent to the base of the bore and short on the other end remote from the bore base;
   an expanding piece having a longitudinal length greater than the length of said socket part and including a first part having a top portion with a width greater than the diameter of said tubular portion to press said socket against the wall of the bore and a second part, including a first section having a width substantially equal to the inner diameter of said tubular portion and a second section having a width greater than the width of said first section, said first part including two trapezoidally-shaped sections, one of said trapezoidally-shaped sections including said top portion as a base thereof, the smallest base of said trapezoidally-shaped sections having its largest width smaller than the internal diameter of said socket to fit within said socket, said top portion cooperating with said socket to urge the wall of said socket into engagement with the wall of the bore;
   said second section including a cross-piece having ends which extend through said longitudinal slots and engage the outer facing portion of the wall or ceiling when said top portion urges the wall of said socket into engagement with the wall of the bore, said cross-piece being rotated at an angle of 90° from said top portion; and,
   said element including a hollow tubular portion joined with the tubular portion of said socket and being held to the wall or ceiling by the conjoint action of said top part and said cross-piece with said socket.

* * * * *